United States Patent [19]
Samokovliski et al.

[11] 4,085,880
[45] Apr. 25, 1978

[54] DEVICE FOR PLANETARY ELECTRODE WIRE-FEEDING HAVING AUTOMATIC ADJUSTING MEANS FOR THE PUSHING FORCE EXERTED ON THE ELECTRODE WIRE

[75] Inventors: David Albert Samokovliski; Petko Kostadinov Grozdanov; Alfred Emmerich Nemechek; Simeon Georgiev Punchev; Peter Dimitrov Petrov, all of Sofia, Bulgaria

[73] Assignee: Institute po Zavaryavane, Sofia, Bulgaria

[21] Appl. No.: 726,424

[22] Filed: Sep. 24, 1976

[30] Foreign Application Priority Data

Sep. 24, 1975 Bulgaria .................................. 33771

[51] Int. Cl.² ........................................... B65H 17/22
[52] U.S. Cl. ...................................... 226/90; 226/176; 226/181
[58] Field of Search ................... 226/90, 91, 181, 186, 226/187, 176, 177

[56] References Cited

U.S. PATENT DOCUMENTS

| | | | |
|---|---|---|---|
| 1,355,616 | 10/1920 | Mohn | 214/339 X |
| 3,517,844 | 6/1970 | Wloszek | 214/338 |

*Primary Examiner*—Richard A. Schacher

[57] ABSTRACT

A planetary electrode-wire feeding device in which the calibrated pushing force exerted on the electrode wire by a pair of feed rollers is automatically adjusted. This automatic adjustment is effected by a cam which is drivingly connected to a drive motor. A housing is operatively drivingly connected to the cam for rotation via a pair of double-armed levers. The housing has a pair of radial bores in which a pair of pistons are respectively reciprocally mounted. Upon a predetermined rotation of the cam, one arm of the double-armed levers is pivoted outwardly and the other inwardly, thereby the pistons are pushed inwardly by the double-armed levers and, due to a wedging action between the levers and the housing, the latter begins to rotate and the electrode wire is pushed forwardly by feed rollers.

8 Claims, 6 Drawing Figures

DEVICE FOR PLANETARY ELECTRODE WIRE-FEEDING HAVING AUTOMATIC ADJUSTING MEANS FOR THE PUSHING FORCE EXERTED ON THE ELECTRODE WIRE

CROSS-REFERENCE TO RELATED APPLICATIONS

This application is related to the following copending, coassigned Samokovlisky et al applications filed on even date herewith: (1) Ser. No. 726,280, based on the first-filed Bulgarian application No. 33,773 dated Sept. 24, 1975; (2) Ser. No. 726,278, based on the first-filed Bulgarian application No. 33,772, dated Sept. 24, 1975; (3) Ser. No. 726,279, based on the first-filed Bulgarian application No. 33,770, dated Sept. 24, 1975; and (4) Ser. No. 726,412, based on the first-filed Bulgarian application No. 31,062 dated Aug. 24, 1975.

BACKGROUND OF THE INVENTION

The present invention relates to a device for planetary electrode-wire-feeding in automatic and semiautomatic electric-arc welding machines, wherein the pushing force that is applied to the electrode-wire is automatically adjusted.

A device has been developed for the same purpose wherein the pushing force applied to the electrode-wire is also automatically adjusted. In this other device, developed by the applicants, a housing is provided in which there are machined a pair of bores extending radially relative to the feed direction of the electrode wire. A pair of pistons are movably seated in the bores, each piston supporting rotatably a feed roller and the axes of these feed rollers are skewed relative to each other. The electrode-wire is fed between the feed rollers.

The other side of the housing is formed as a hollow cylindrical threaded part onto which a guide cone having a threaded internal bore is threadably mounted. The guide cone is drivably connected to an electric motor. A pair of double-armed levers are mounted on the housing by means of articulated joints. One of the ends of the double-armed levers are in contact with the guide cone surface and the other ends are in contact with the respective piston heads. The double-armed levers lie in a plane which passes also through the electrode-wire. The axes of the pistons also pass through this same plane. The pistons can be formed with blind holes in which springs are mounted. The springs press the pistons continuously toward the double-armed levers as well as toward the electrode-wire via the feed rollers mounted thereon.

The aforedescribed device, which is related to the device of the instant invention and which has been developed by the same joint inventors, has the drawback of having substantial frictional forces formed when the guide cone and the hollow cylindrical portion of the housing threadably move relative to each other. Such frictional forces retard the movement of one part relative to the other. This retardation causes a concomitant retardation of the engagement and disengagement of the feed rollers with the electrode-wire.

The double-armed levers lie in a plane which is parallel to the direction of pivoting of the levers and if the direction of pivoting is not rigorously maintained the levers frequently are twisted and then the device malfunctions. Furthermore, the whole arrangement is rather compact and therefore the double-armed levers have relatively short arms and their effectiveness is therefore limited.

SUMMARY OF THE INVENTION

It is a general object of this invention to provide a planetary electrode-wire feeding device wherein a pair of rollers, having skewed axes, contact an electrode-wire fed therebetween with an automatically adjusted contacting force. Each one of the rollers is rotatably mounted on an axle which is supported by a piston. The pistons are mounted in bores of a housing. Each piston is spring loaded. The electrode-wire is fed through a central bore of the housing.

A pair of double-armed levers are mounted on the periphery of the housing by means of articulated joints. One arm of the double-armed levers is in contact with the piston head and the other arm is in contact with the peripheral surface of a rotatably cam having symmetrically disposed cam surfaces.

The cam is rigidly secured to the shaft of an electric driving motor and this cam rotates jointly with the housing due to a wedging action by the double armed levers. The cam body is disc shaped and has a hub by means of which the cam is connected to the drive shaft of the motor. The cam surface of the cam body has arcuate as well as cut-out portions.

An alternate embodiment of the device of this invention has basically the same operational characteristics but the cam body itself has a cup-like shape and has a hub. The cam surfaces of this cam body are disposed in the internal peripheral surface of the cup-shaped cam. The housing of the device is coaxial with this cup-shaped cam body and is seated in it.

The double-armed lever in this alternative embodiment of the device of this invention are arcuately shaped and are fulcrumed on the housing. The ends of the arms of the double-armed levers have rounded portions or rollers. The double-armed levers lie in planes which are perpendicular to the direction of movement of the electrode-wire.

The device of this invention performs the automatic adjustment of the feed rollers in a substantially shorter time than comparable devices and the adjustment is carried out with a minimum of frictional losses.

BRIEF DESCRIPTION OF THE DRAWING

The invention is further set forth in the following detailed description taken in conjunction with the appended drawing, in which.

DETAILED DESCRIPTION

Figure 2:
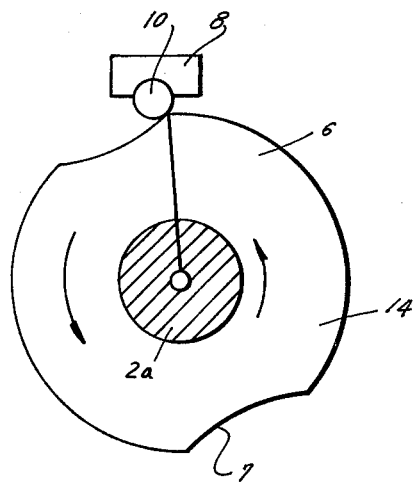
FIG. 2 is a sectional view along line A—A in FIG. 1.
Figure 1:
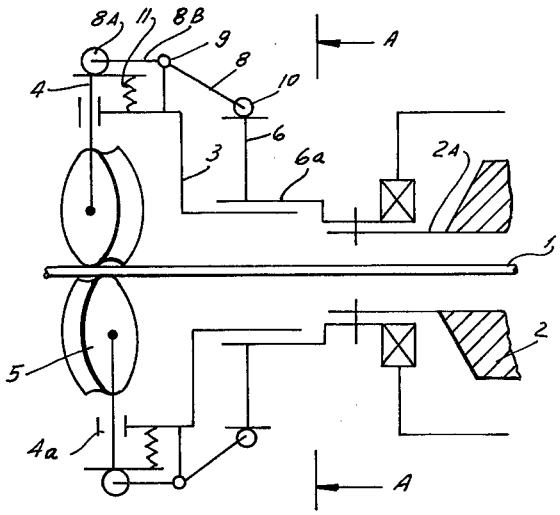
FIG. 1 is a schematic elevational view showing the kinematic relationship of various parts of a first embodiment of the invention.
Figure 3:
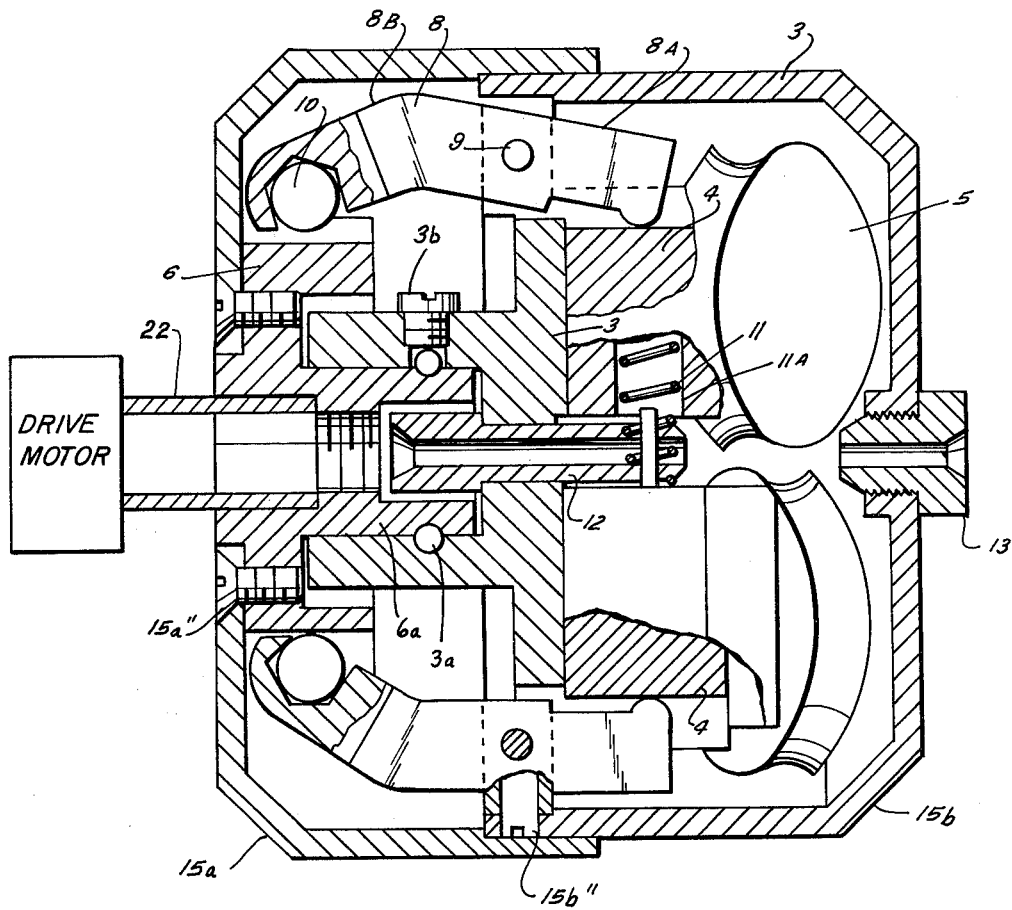
FIG. 3 is a longitudinal sectional side view of the first embodiment of the invention as illustrated schematically in FIG. 1.

The embodiment illustrated in FIGS. 1 – 3 includes an electric drive motor 2, having a hollow drive shaft 2a on which a cam body 6 is coaxially rigidly mounted.

The cam 6 is in the shape of a disc having arcuate cam surfaces as well as cut-outs 7, symmetrically disposed around the periphery of the cam 6. The cam 6 has a hub portion 6a with which the housing 3 is coaxially connected. A nozzle member 12 extends into the hub 6a and is axially mounted in the housing 3. The electrode-wire 1 is fed through a central bore of the nozzle member 12. A pair of pistons 4 are reciprocally mounted in a pair of radial bores 4a disposed in the housing 3. Each piston has an axle on which a feed roller 5 is rotatably mounted. The rollers 5 and supporting axles therefore are skewed relative to each other as can be noted from FIGS. 1 and 3.

Each piston 4 has a blind bore 11a in which a coil spring 11 is disposed. This coil spring 11 rests on a stop surface of the housing 3 and pushes the respective piston outwardly relative to the electrode-wire 1.

A pair of double-armed levers 8 are pivotally supported on the housing 3 near the outer periphery thereof on a pair pivot shafts 9. The ends of the double-armed levers may be formed as rounded portions or may actually have a ball 10 mounted in a spherical groove near the end of the arm of the double-armed lever. One end 8a of the double-armed lever rests on the piston head of the piston 4 and the other arm 8b of the double-armed lever 8 contacts with its ball 10 the cam surface 7 of the cam 6.

The entire arrangement is enclosed by means of a pair of covers 15a, 15b. The cover 15a is screwed by means of screws 15a" to the cam 6, whereas the cover 15b is screwed by means of screw 15b" to the housing 3. The front portion of the cover 15b has an outlet nozzle member 13 mounted axially relative to the nozzle member 12 which serves to guide the exiting electrode-wire 1.

The first embodiment of the device of this invention operates as follows:

When the electric motor 2 is at a standstill, the arm 8b with the ball 10 rests on the radially inner most portion of the cam surface 7.

In this position the pistons 4 and the wire-feeding rollers 5 mounted thereon are spaced a maximum distance from the electrode-wire 1 so that the wire 1 lies freely in the inlet nozzle member 12 and outlet nozzle member 13.

The electric motor 2 is switched on and rotates the cam 6 of the drive shaft 2a. The location of the cam 6 causes a pivoting of the double-armed levers 8 about their pivot shafts 9 by virtue of a contacting of the balls 10 with the cam surfaces 7 of the cam 6. The pivoting of the double-armed lever 8 causes a radially inner pressing of the pistons 4 by means of the arms 8a which causes the rollers 5 to move toward and contact the electrode-wire 1. The wire feeding rollers 5, pressing against electrode-wire 1, start to rotate, about their own axes as well as jointly with the housing 3, around the electrode-wire 1 due to a wedging action between the cam 6 and the housing 3. As shown in FIG. 3, housing 3 and eccentric body 6 are maintained against relative axial movement by means of ball members 3a positioned in separate seats in member 3 and fitting in an annular groove in member 6a. The radially outer ends of such setas in member 3 are closed by regulating screws 3b. The driving connection between elements 6 and 13 is carried through levers 8, pistons 4, and rollers 5 only when rollers 5 have pressed the electrode wire between them. When the rollers 5 engage the wire members 6 and 3 rotate together to feed the wire forward. These rotational movements cause the device to push forward the electrode-wire 1 through the outlet nozzle 13.

When the electric motor 2 is shut-off the cam 6 connected thereto via the drive shaft 2a stops to rotate. However, due to inertial forces, the housing 3 and the appurtenant mechanisms continue to rotate for a short time. This continuing movement causes the double-armed levers 8 with their balls 10 to descend again to the radially inner most portion of the cam surface 7, that is, they return to their initial position which they occupied before the starting of the device. The springs 11 now may push the rollers 5 away from the electrode-wire 1 thereby releasing the latter and terminating the pushing action thereon.

Figure 4:
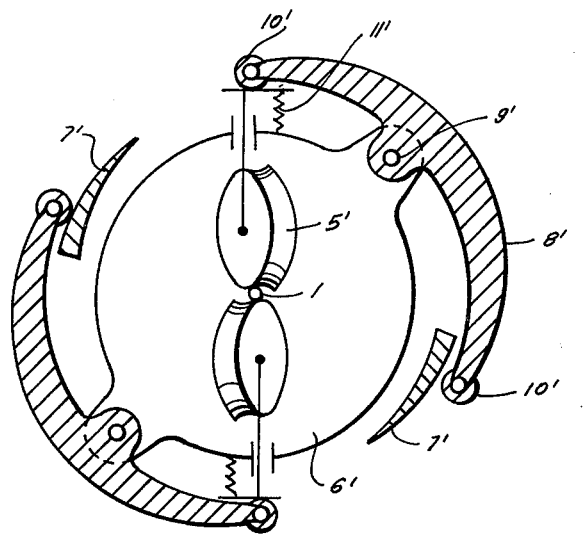
FIG. 4 is a schematic elevational view of a second embodiment of the invention wherein the kinematic relationship of various parts are illustrated.
Figure 5:
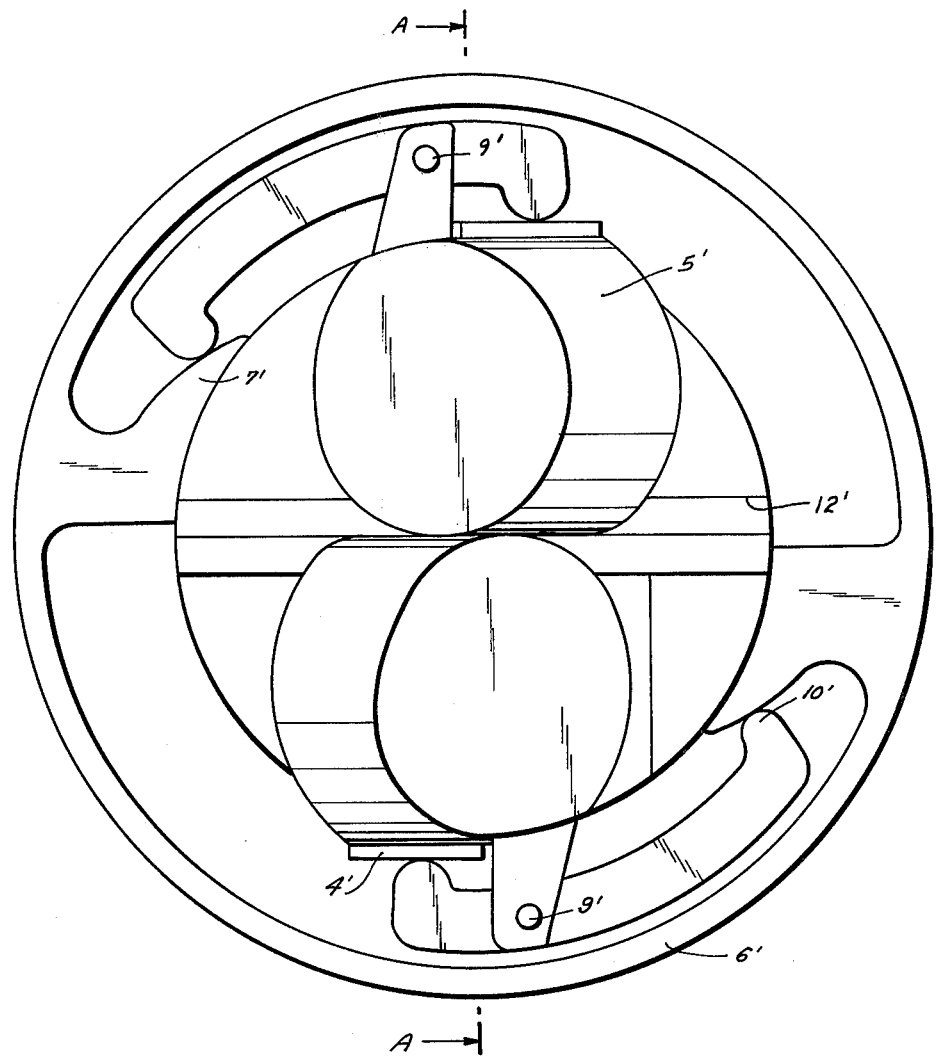
FIG. 5 is a cross-sectional side view of the second embodiment of the invention illustrated in FIG. 4 viewed in the feed direction of the electrode-wire.
Figure 6:
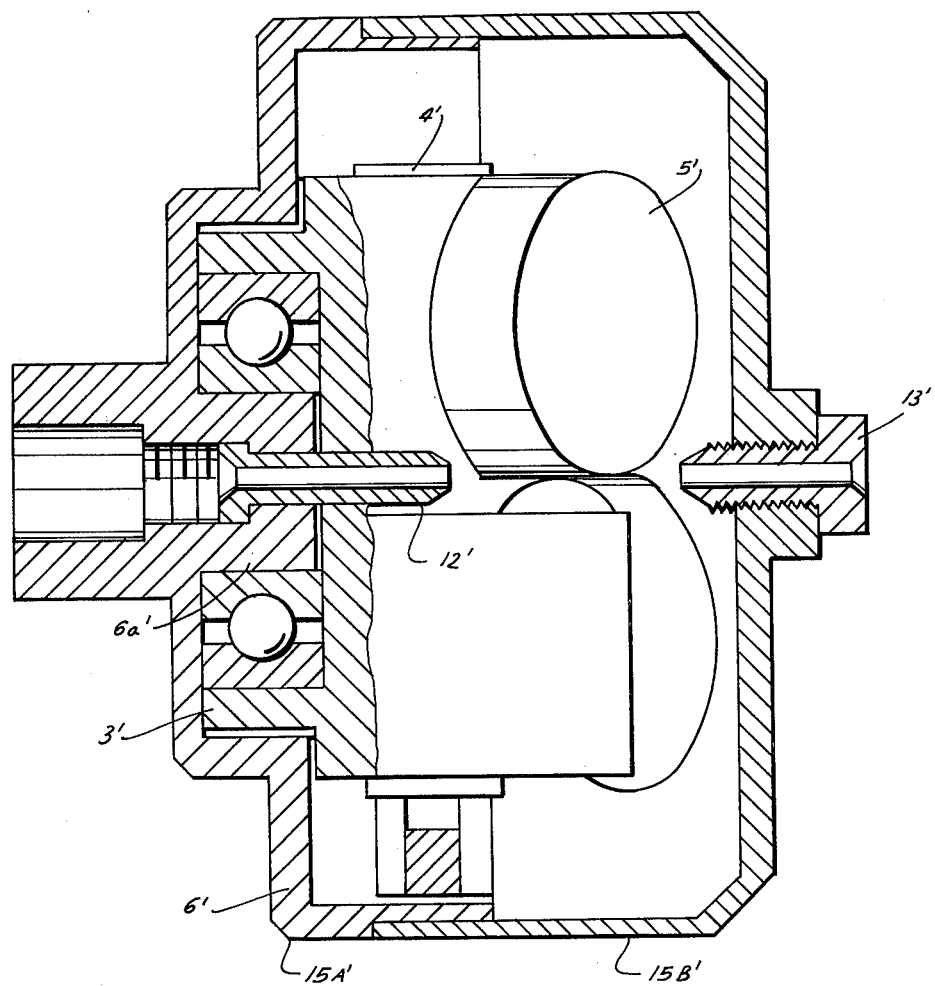
FIG. 6 is a sectional view along line A—A of FIG. 5.

A second preferred embodiment of the invention is illustrated in FIGS. 4 – 6. In this second embodiment, all those parts which are identical or equivalent to the parts illustrated in the embodiment of FIGS. 1 - 3, have the same reference numerals with a (') added.

In this second embodiment the cam 6' is cup-shaped and has cam surface 7' in the inner periphery of the cup-shaped cam 6'. A rounded portion or roller 10' of a double-armed lever 8' is adapted to contact this cam 7'. In a manner similar to that of the first embodiment of the invention, the housing 3' is mounted on a hub 6a of the cam 6'. The arrangement is enclosed in a pair of cover portions 15a' and 15b' similar to the arrangement of FIGS. 1 - 3. The arrangements further includes nozzle members 12' and 13' which perform analogous functions as the nozzle members of the embodiment of FIGS. 1 - 3.

In this embodiment, the double-armed levers 8' have an arcuate shape and are provided with rounded portions or rollers 10' at their free ends. The double-armed levers 8' are situated in a plane which is perpendicular to the direction of movement of the electrode-wire 1.

The device of the embodiment of FIGS. 4 – 6 operates in an analogous manner as the embodiment of FIGS. 1 - 3. Prior to the starting of the electric motor 2 the double-armed levers contact with their rollers 10' the radially inner most portion of the cam surfaces 7'. After the cam 6 begins to rotate the cam surfaces 7' cause the double-armed levers 8' to pivot about their pivot supports 9' thereby causing a radially inner movement of the other free ends of the double-armed levers 8' which cause the pistons 4' to move radially inwardly thereby causing the feed rollers 5' to contact and press against electrode-wire 1. The rotation of the pair of feed rollers 5' causes the electrode-wire 1 to be fed forwardly through the nozzle member 13'.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A device for planetary feeding of an electrode-wire by means of a pair of rollers which are adapted to contact and convey the electrode-wire with a force that is automatically adjusted, comprising in combination, a rotatable housing having an axial bore through which the electrode-wire is adapted to be fed, said housing having a pair of radially extending bores;

a pair of pistons reciprocally mounted in said pair of bores, each piston rotatably supporting a roller of said pair of rollers, the axes of said pair of rollers being skewed relative to each other;

biasing means connected to said pair of pistons and biasing them radially outwardly relative to said electrode-wire;

a motor having a drive shaft;

a cam drivingly connected to said drive shaft;

a pair of double-armed levers being fulcrumed to opposite sides of said housing;

a first arm of said double-armed levers coacting with one of said pistons of said pair of pistons and the second arm coacting with said cam, so that when said cam is rotated by said drive shaft said first arm is pivoted and urges said piston to contact said electrode-wire against the action of said biasing means to cause said housing to rotate and said pair of rollers to convey said electrode-wire;

said cam and housing being coaxially disposed for mutual coaction and said electrode-wire being axially fed therethrough.

2. The device as set forth in claim 1, wherein said cam is formed as a disc which has cam surfaces symmetrically disposed around the axis of said disc, a first portion of said cam surfaces are formed by cutouts on said disc and a second portion of said cam surfaces are formed by arcuate portions of said disc, the free end of the second arm of said double-armed levers being disposed in said first portion of said cam surfaces when the device is at rest.

3. The device as set forth in claim 1, wherein said pair of double-armed levers lie in a plane which also passes through said electrode-wire.

4. The device as set forth in claim 1, wherein said cam is cup-shaped and has a hub portion, said drive shaft being coaxially connected to said hub portion.

5. The device as set forth in claim 4, wherein said cup-shaped cam has cam surfaces which project inwardly relative to said electrode-wire, said second arm of said double-armed levers coacting with said inwardly projecting cam surfaces.

6. The device as set forth in claim 1, wherein said cam includes a cylindrical portion which envelops at least partially said housing.

7. The device as set forth in claim 1, wherein said double-armed levers have an arcuate shape and a roller is operatively mounted on the free ends of said first and second arms.

8. The device as set forth in claim 1, wherein said double-armed levers lie in a plane which is perpendicular to the direction of movement of said electrode wire.

* * * * *